United States Patent [19]
Kaneko

[11] Patent Number: 5,120,001
[45] Date of Patent: Jun. 9, 1992

[54] FISHING REEL WITH DRAG MECHANISM
[75] Inventor: Kyoichi Kaneko, Tokyo, Japan
[73] Assignee: Daiwa Seiko Inc., Tokyo, Japan
[21] Appl. No.: 545,527
[22] Filed: Jun. 29, 1990

[30] Foreign Application Priority Data

Jul. 7, 1989 [JP] Japan ................................. 1-174182
Jul. 20, 1989 [JP] Japan ................................. 1-187242

[51] Int. Cl.⁵ ............................................. A01K 89/027
[52] U.S. Cl. ..................................... 242/245; 242/246
[58] Field of Search ............... 242/245, 246, 247, 248, 242/232, 302, 303; 188/82.7, 82.77

[56] References Cited

U.S. PATENT DOCUMENTS

| | | | |
|---|---|---|---|
| 998,003 | 7/1911 | Howe | 188/82.4 |
| 2,705,113 | 3/1955 | Bonanno | 242/247 |
| 2,777,645 | 11/1957 | Wood | 242/232 |
| 3,520,488 | 7/1970 | Voutheir | 242/247 |
| 4,249,706 | 10/1981 | Haselbauer et al. | 242/247 |
| 4,702,432 | 10/1987 | Kaneko et al. | 242/246 |
| 4,746,077 | 5/1988 | Toda | 242/245 |
| 4,832,279 | 5/1989 | Maruyama | 188/82.4 |
| 4,938,433 | 7/1990 | Toda | 242/246 |

FOREIGN PATENT DOCUMENTS

| | | | |
|---|---|---|---|
| 0315552 | 6/1987 | Fed. Rep. of Germany | 242/246 |
| 61-197872 | 12/1986 | Japan . | |
| 0391316 | 4/1933 | United Kingdom | 108/82.77 |

Primary Examiner—Katherine Matecki
Attorney, Agent, or Firm—Longacre & White

[57] ABSTRACT

A spinning reel which is for fishing and includes a drag mechanism and a shift mechanism which is for shifting a spool between a drag state and a release state. The reel has a shift mechanism provided between a spool and a spool shaft so that a rotor turning mechanism, a spool sliding mechanism and so forth, which are provided in a casing of the reel, are not restricted. The reel may be provided with a return mechanism by which the shift mechanism can be engaged so that the spool can be shifted from a freely rotating state to a state in which the drag mechanism is engaged.

9 Claims, 8 Drawing Sheets

FISHING REEL WITH DRAG MECHANISM

BACKGROUND OF THE INVENTION

The present invention relates to a spinning reel for fishing which has a drag mechanism for applying a braking force to the spool.

In the drag mechanism of a conventional spinning reel, the drag adjustment knob can be turned to gradually increase or decrease the braking force. In some instances during actual fishing, however, the drag mechanism must be suddenly released so the spool rotates freely in order to prevent breaking a fishline or tearing the hook out of the mouth of a fish, to promote the biting of a fish, etc. Since the drag adjustment knob must be turned by at least one rotation to release, it is impossible to easily and quickly release the mechanism. To solve this problem, a spinning reel in which the spool can be immediately released, through one-shot manipulation is disclosed in the Japanese Utility Model Unexamined Publication No. Sho. 61-197872 and the U.S. Pat. No. 4,746,077.

However, since the mechanism for the shifting is provided in the casing of each of the above-mentioned conventional spinning reels, not only the mechanism but also a rotor turning mechanism, a spool sliding mechanism and a mechanism for returning the spool from free rotation to drag are located in the casing so that the interior of the casing is very complicated. Thus, it is very troublesome to assemble and disassemble the reel, the reel is likely to develop mechanical problems, the casing is large in size and weight, and the possible positions for locating the lever of a mechanism for stopping the rotor are restricted.

SUMMARY OF THE INVENTION

The present invention was made in order to solve the above-mentioned problems.

Accordingly, it is an object of the present invention to provide a spinning reel which is for fishing and includes a drag mechanism and a shift mechanism for shifting a spool between drag and free rotation. In the spinning reel, a spool shaft supporting the spool at the front portion of the shaft receives a braking force from the drag mechanism provided in the rear portion of the casing of the reel. The reel is characterized in that the shift mechanism for shifting the spool between drag and free rotation is provided between the spool and the spool shaft.

It is another object of the present invention to provide a spinning reel which is for fishing and in which a spool is provided with a drag mechanism to brake the rotation of the spool, and a shift mechanism for shifting the spool between drag and release is located at the spool. The spool is mounted at the front portion of a spool shaft and provided with the drag mechanism to apply a braking force to the spool. The shift mechanism is provided between the spool and the spool shaft.

A return mechanism, by which the shift mechanism is returned to drag, can semiautomatically return the shift mechanism from the former state to the latter state in conjunction with the rotation of the rotor of the reel, manually return the shift mechanism from the former state to the latter, or both semiautomatically return the shift mechanism from the former state to the latter in conjunction with the rotation of the rotor and manually return the shift mechanism from the former state to the latter.

DETAILED DESCRIPTION OF THE PREFERRED EMBODIMENTS

Figure 1:
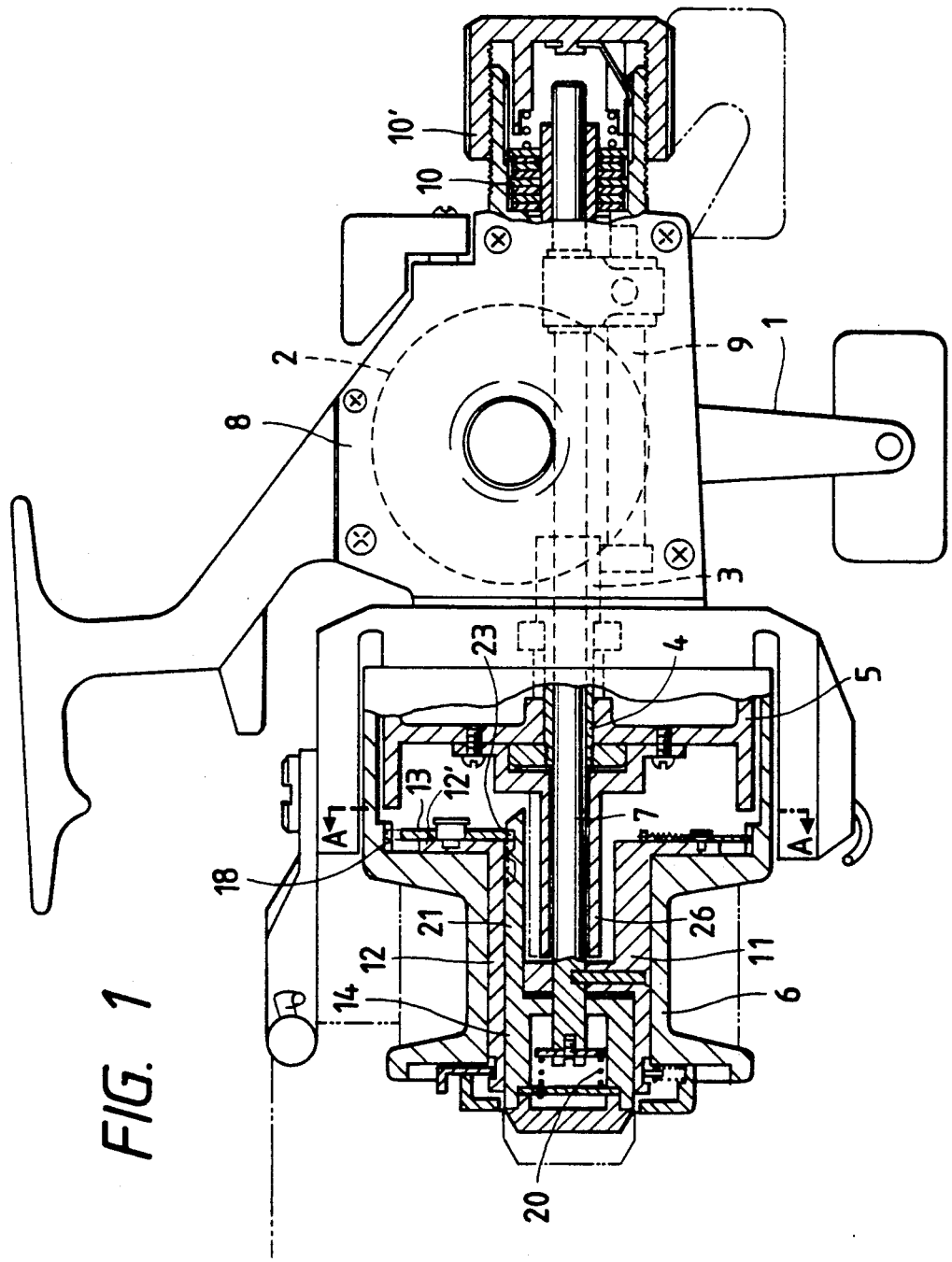
FIG. 1 is a sectional side view of a spinning reel which is an embodiment of the present invention.

Embodiments of the present invention are hereinafter described in detail with reference to the drawings attached hereto.

FIGS. 1-7 show a first embodiment of a spinning reel. The reel has a handle 1, a drive gear 2, a pinion 3, a rotary quill 4, a rotor 5, a spool 6, a spool shaft 7, a casing 8, a conventional sliding mechanism 9, a drag mechanism 10, a drag adjustment knob 10', and a shift mechanism 11. The rotor 5, on which a fishline is engaged, is secured to the rotary quill 4, which is rotated by the handle 1 through the drive gear 2 and the pinion 3 engaged therewith. The spool shaft, at the tip portion of which the spool 6 is provided, is slidably fitted in the rotary quill 4. The sliding mechanism 9 and the drag mechanism 10 are provided on the spool shaft 7 in the casing 8 so that the drag mechanism is located at the rear end of the spool shaft. The slip rotation of the spool shaft 7 can be braked by the drag mechanism 10 through the manipulation of the drag adjustment knob 10'. The shift mechanism 11 for shifting the spool 6 between drag is provided between the spool 6 and the spool shaft 7.

Figure 3:
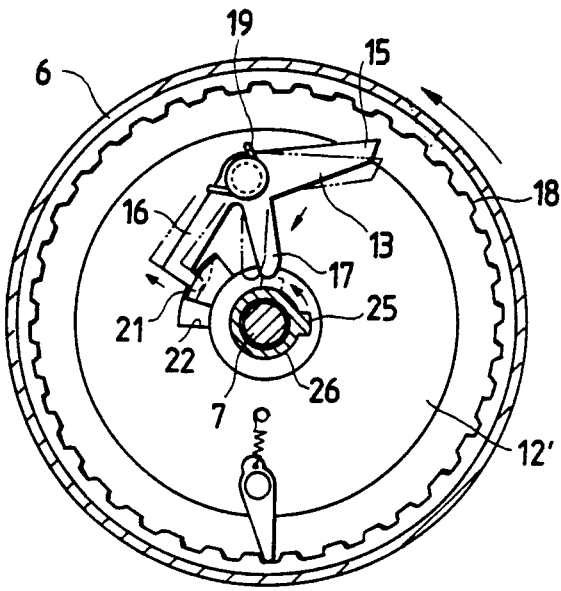
FIG. 3 is a sectional view of the spinning reel along a line A—A shown in FIG. 1.
Figure 4:
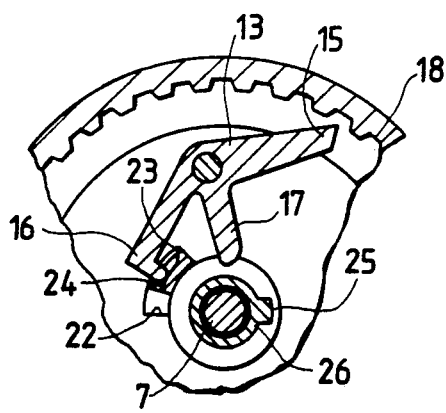
FIGS. 4, 5 and 6 are sectional views showing the operation of the spinning reel.

The shift mechanism 11 includes a spool support cylinder 12, an engagement member 13, and a manipulation member 14. The spool 6 is fitted on the spool support cylinder 12 so that the spool can be rotated. The engagement member 13 is for engaging the spool support cylinder 12 with the spool 6. The manipulation member 14 is provided in the spool support cylinder 12 so as to manipulate the engagement member 13. The engagement member 13 includes an engagement claw 15, a manipulating portion 16 and a return portion 17, and is attached to a flange 12' provided integrally with the spool support cylinder 12. The engagement member 13 is urged by a spring 19 so that the engagement claw 15 can be engaged with one of the engagement projections 18 of the inside circumferential surface of the rear half portion of the spool 6. The manipulation member 14 has its body fitted in the front half portion of the spool support cylinder 12 and is urged in an outward direction by a helical spring 20 so that the operating portion 21 of the manipulation member, which projects from one end of the body of the member, is kept at one end of a notch 22 provided in the inner portion of the spool support cylinder 12. The tip of the operating portion 21 is located at that of the operating portion 16 of the engagement member 13. When the manipulation member 14 is pushed inward against the urging force of the helical spring 20, the operating portion 16 is turned clockwise as shown in FIG. 3 and engaged with an engaging notched part 24 having a stranding projection 23, so that the engagement claw 15 is disengaged from the engagement projection 18 of the spool 6.

A return member 26 having a projection 25 is secured to the front of the inner portion of the rotor 5. A return mechanism is made of the return member 26 and the return portion 17 of the engagement member 13. When the rotor 5 is turned by the handle 1, the projection 25 of the return member 26 is revolved so that the projection 25 comes into contact with the return portion 17 of the engagement member 13, and the engagement claw 15 disengages from the engagement projection 18 of the spool 6 and turns the return portion to rotate the engagement member 13 clockwise as shown in FIG. 3 to disengage the operating portion 16 from the engaging notched part 24.

Figure 5:
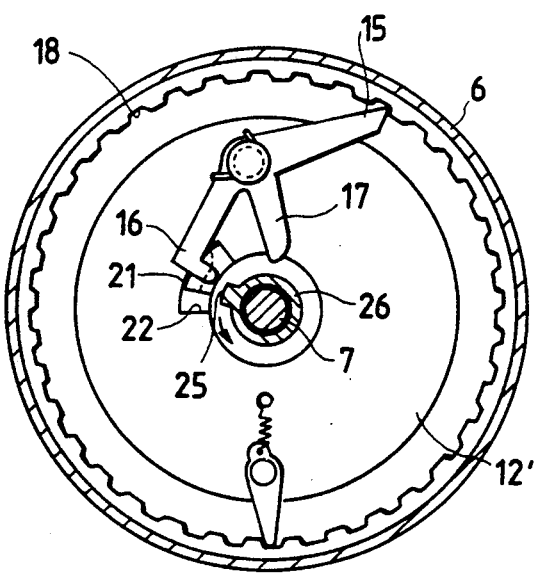

When the manipulation member 14 is pushed in against the urging force of the helical spring 20, from a position shown by a dotted line in FIG. 1 to a position shown by a full line therein, the operating portion 16 of the engagement member 13 is moved from the s state shown in FIG. 5 and is then engaged with the engaging notched part 24 of the operating portion 21 of the manipulation member 14. The engagement claw 15 of the engagement member is disengaged from the engagement projection 18 of the spool 6 so that the spool is supported rotatably relative to the spool support cylinder 12, as shown in FIG. 3. The spool 6 is thus released from the action of the drag mechanism 10 so that the spool can rotate freely therefrom. When the rotor 5 is thereafter turned by rotating the handle 1, the projection 25 of the return member 26 comes into contact with the return portion 17 of the engagement member 13 to turn the engagement member clockwise to disengage the operating portion 16 from the engaging notched part 24 to move the manipulation member 14 forward by the outward urging force of the helical spring 20 and the engagement claw 15 is engaged with the engagement projection 18 of the spool 6 as shown in FIG. 5, to connect the spool to the spool shaft 7. The spool 6 is thus semiautomatically returned to drag.

Figure 2:
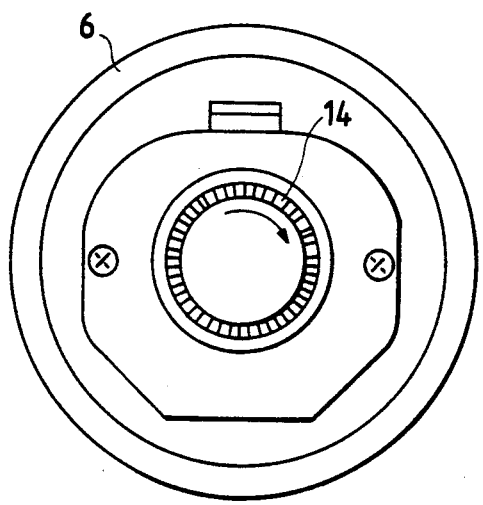
FIG. 2 is a front view of the spinning reel.
Figure 6:
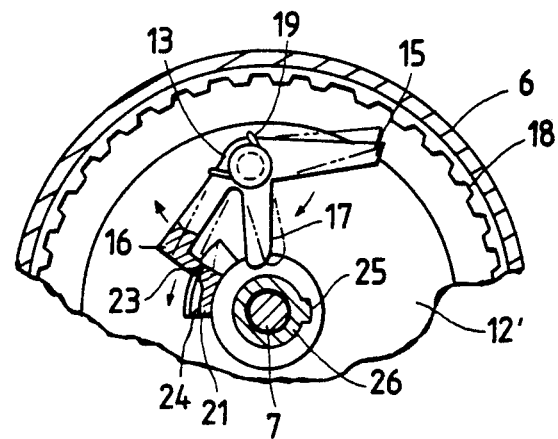
Figure 7:
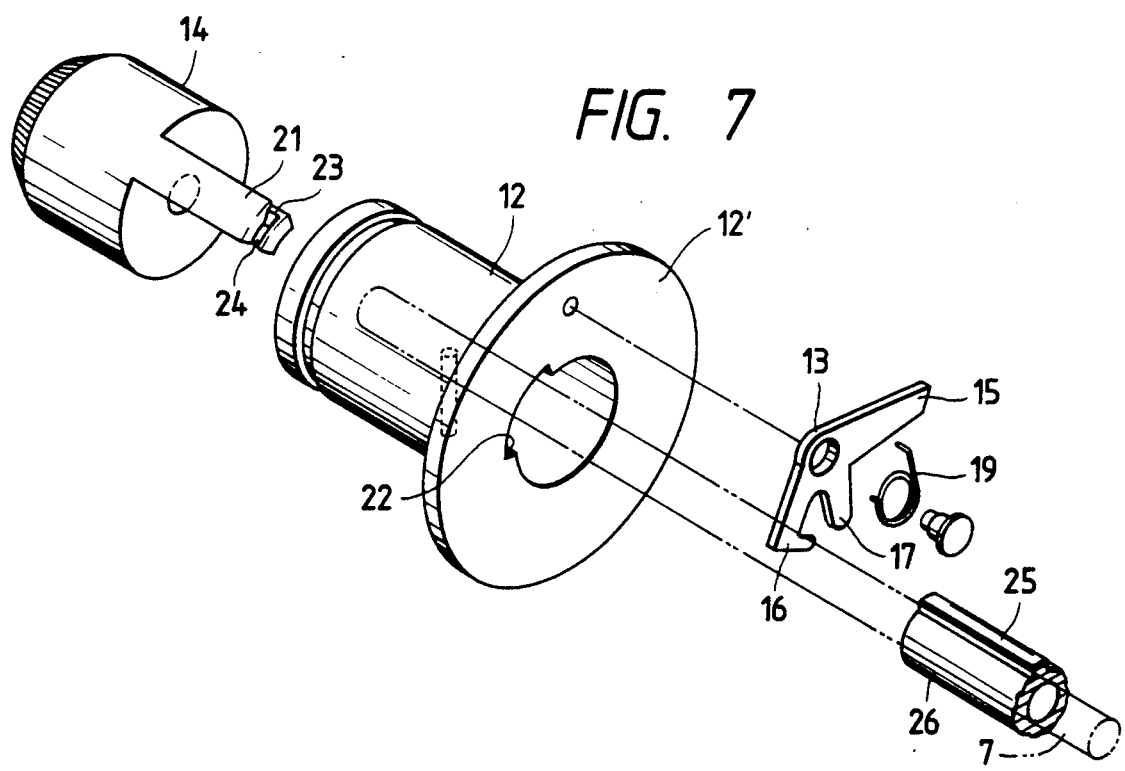
FIG. 7 is a perspective exploded view of a major part of the spinning reel.
Figure 8:
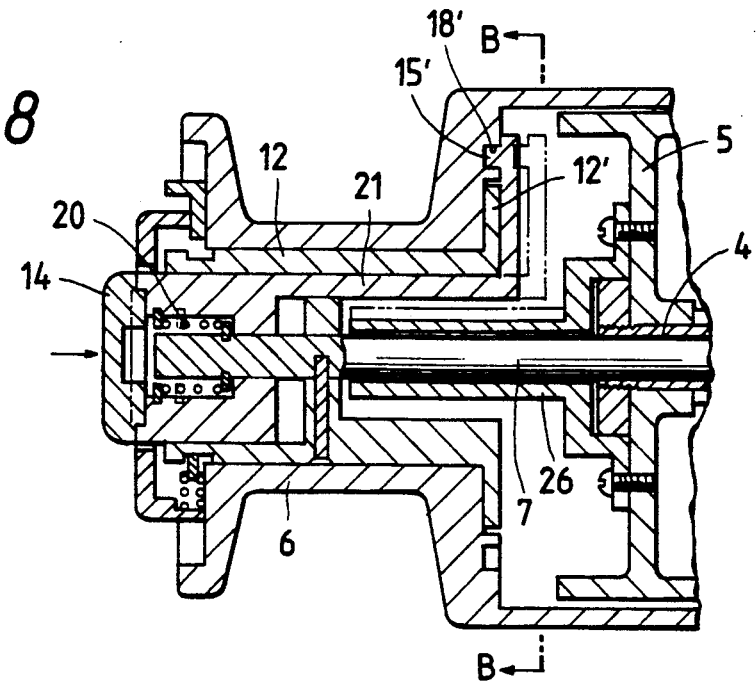
FIG. 8 is a sectional view of a another embodiment of a spinning reel.

When the manipulation member 14 is moved in the notch 22 of the spool support cylinder 12 toward the other end of the notch against the urging force of the helical spring 20 as shown by an arrow in FIG. 2, the operating portion 21 of the manipulation member is turned counterclockwise in the notch as shown in FIG. 6, so that the operating portion 16 of the engagement member 13 is stranded onto the projection 23 of the engaging notched part 24 of the manipulation member up from the non-projection surface of the part and the manipulation member is moved forward by the urging force of the spring. The spool 6 is thus manually returned to the state of receiving the action of the drag mechanism 10.

Figure 9:
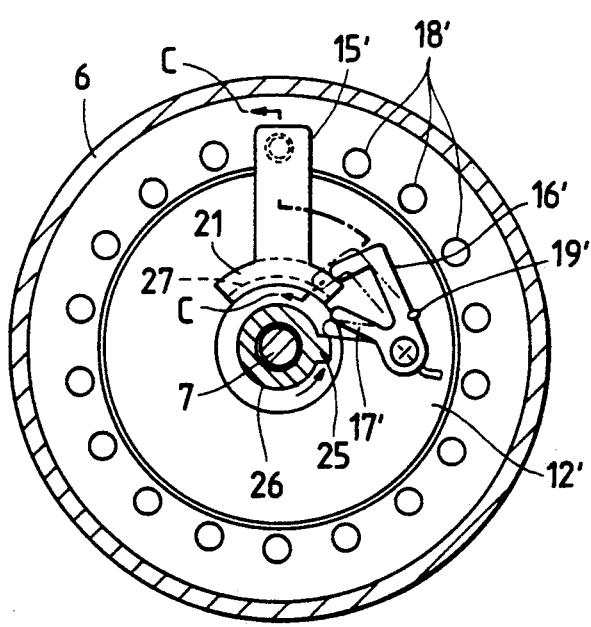
FIG. 9 is a sectional view of the spinning reel along a line B—B shown in FIG. 8.
Figure 10:
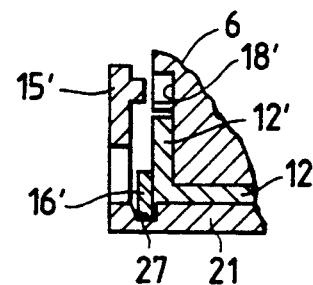
FIGS. 10 and 11 are sectional views for describing the operation of a part of the spinning reel along a line C—C shown in FIG. 9.
Figure 11:
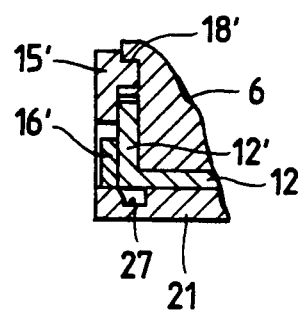

FIGS. 8, 9, 10 and 11 show a spring fishing reel which is a second embodiment. The difference of the reel from that shown in FIGS. 1, 2, 3, 4, 5, 6 and 7 is that the rear of spool 6 has a plurality of engagement recesses 18' on a circle, the tip of the operating portion 21 of a manipulation member 14 is formed with an engagement claw 15' projecting in the radial direction of the reel and capable of being engaged in the engagement recesses 18', a stopper 16' having a return portion 17' urged toward the axis of the reel by a spring 19' is supported by the flange 12' of a spool support cylinder 12, and an engagement groove 27 is provided in the operating portion 21 at the butt of the engagement claw 15' and capable of being engaged with the stopper. When the manipulation member 14 is pushed inward so that the engagement claw 15' is disengaged from the engagement recess 18', the stopper 16' is engaged in the engagement groove 27 to keep the engagement claw disengaged from the engagement recess. As a result, the spool 6 is made rotatable relative to the spool support cylinder 12. The spool thus rotates freely from the action of a drag mechanism 10. When a handle 1 is thereafter rotated, the projection 25 of a return member 26 comes into contact with the return portion 17' of the stopper 16' to turn the stopper outward against the urging force of the spring 19' in the radial direction of the reel to disengage the stopper out of the engagement groove 27 as shown in FIG. 9. As a result, the manipulation member 14 is moved outward by the urging force of a helical spring 20 to engage the engagement claw 15' in the engagement recess 18' to connect the spool 6 and the spool support cylinder 12 to each other. The spool 6 is thus returned to drag.

Although the return member 26 is secured to the rotor 5 in each of the above-described embodiments, the present invention may be otherwise embodied so that the return member is frictionally connected to the rotor to make it possible to smoothly and unimpulsively release the spool from the drag mechanism.

According to first and second embodiments of the present invention, a shift mechanism for shifting a spool into and out of drag is provided between the spool and a spool shaft so as not to restrict the rotor turning mechanism, the spool sliding mechanism and so forth, which are provided in the casing of the spinning reel. For that reason, the drive lines of the reel are not complicated, it is easy to assemble and disassemble the reel, the reel is less likely to develop trouble, the casing can be made smaller in size and weight and the fishing manipulation of the reel is facilitated. Additionally, the spool can be semi-automatically shifted out of release into drag, by a return mechanism which acts in conjunction with rotation of a rotor. The return mechanism is provided at the spool so that the drive lines are not complicated in the casing, and the casing is reduced in size and weight.

FIGS. 12, 13, 14, 15, 16, 17 and 18 show a fishing spinning reel which is a third embodiment. The spinning reel comprises a handle 101, a drive gear 102, a pinion 103, a rotar quill 104, a rotor 105, a spool 106, a spool shaft 107, a casing 108, a conventional sliding mechanism 109, and a drag mechanism for the spool. The rotor 105, on which a fishline is engaged, is secured to the rotary quill 104, which is rotated by the handle 101 through the drive gear 102 and the pinion 103 engaged therewith. The spool shaft 107, at the tip portion of which the spool 106 is provided, is fitted in the rotary quill 104 so that the spool shaft is only slidable in the axial direction thereof.

The spool 106 is rotatably fitted on a coupling cylinder 111 having an engagement flange 110 at the rear end of the cylinder and rotatably fitted on a support cylinder 112 secured to the spool shaft 107. The drag adjustment knob 113 of the drag mechanism is screw-engaged with the coupling cylinder 111 at the front end thereof so that the knob can be moved backward and forward. When the knob 113 is moved backward, drag members 114 fitted on the coupling cylinder 111 in front of the front flange of the spool 106 and at the rear of the rear flange thereof are put into pressure contact with the spool.

An engagement member 119 having an engagement claw 116, an operating portion 117 and a return portion 118 is attached to the flange 115 of the support cylinder 112, which is provided at the rear end of the cylinder. The engagement member 119 is urged by a spring 121 so that the engagement claw 116 can be engaged with one of engagement projections 120 provided on the peripheral portion of the engagement flange 110 of the coupling cylinder 111.

A manipulation member 122 is fitted in the front portion of the support cylinder 112 and urged outward in the radial direction thereof by a helical spring 123 so that the operating portion 124 of the manipulation member, which projects inward from one end of the member in the axial direction thereof, is kept at one end of the notch 125 of the inner portion of the support cylinder 112 by the circumferential urging force of the spring, and the tip of the operating portion is located at the front of the operating portion 117 of the engagement member 119. When the manipulation member 122 is pushed inward against the urging force of the spring 123, the operating portion 117 is turned clockwise as to FIG. 14 so that the portion is engaged with an engaging notched part 126 included in the operating portion 124 of the manipulation member 122 and having a stranding projection 126', and the engagement claw 116 is disengaged from the engagement projection 120 of the engagement flange 110 of the coupling cylinder 111.

A return member 128 having a projection 127 is secured to the front of the inner portion of the rotor 105. When the rotor 105 is turned by the handle 101, the projection 127 comes into contact with the return portion 118 of the engagement member 119 causing the engagement claw 116, disengaged from the engagement projection 120, to swing the return portion to turn the engagement member clockwise as to FIG. 14 to disengage the operating portion 117 from the engaging notched part 126.

A knob 129 for adjusting the resistance to the free rotation of the spool 106 is provided around the manipulation member 122.

Figure 12:
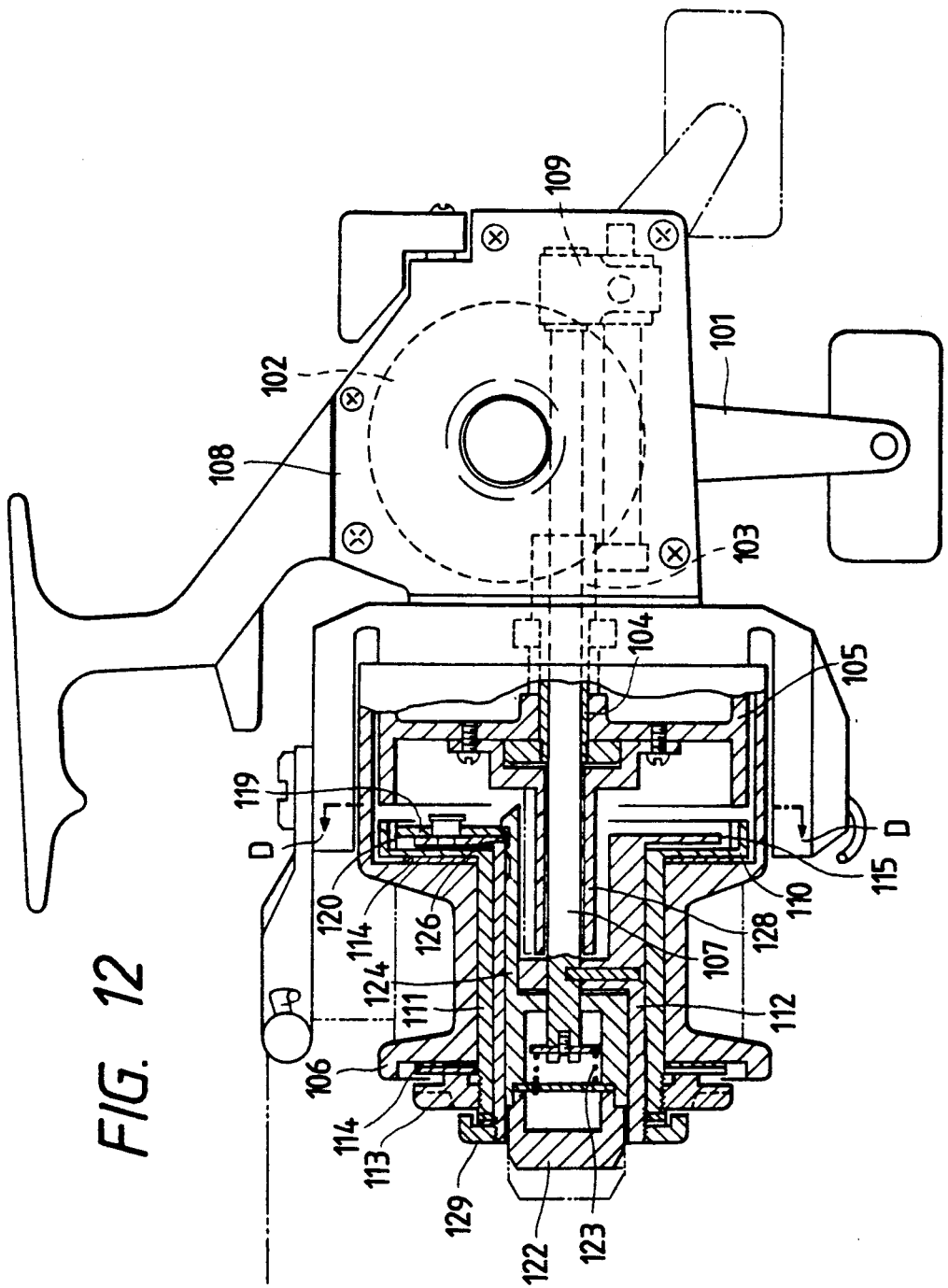
FIG. 12 is a cutaway side view of a spinning reel of another embodiment of the present invention.
Figure 15:
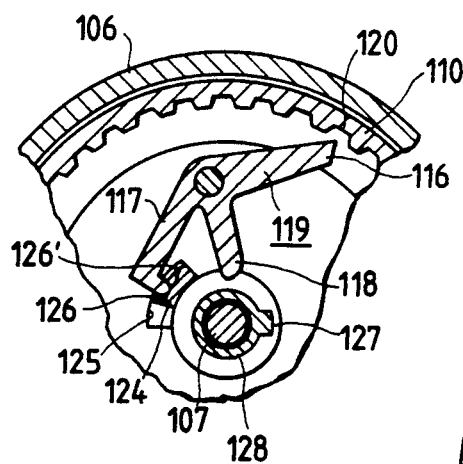
FIGS. 15, 16 and 17 are views for describing the operation of the spinning reel shown in FIG. 12.
Figure 16:
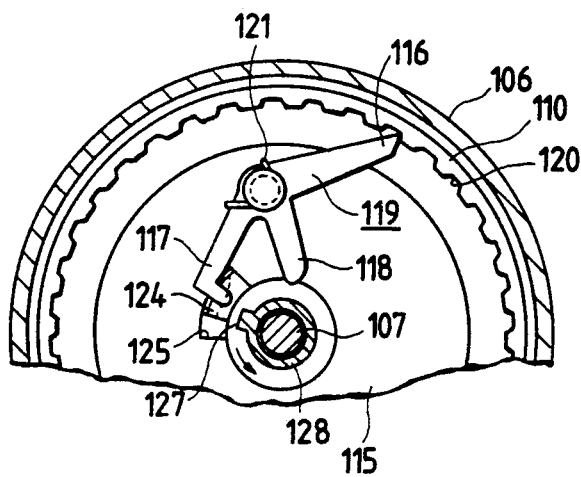

When the manipulation member 122 is pushed in from a position shown by a dotted line in FIG. 12 to a position shown by a full line therein, the operating portion 117 of the engagement member 119 is shifted from the position shown in FIG. 16 and is engaged with the engaging notched part 126 of the operating portion 124 of the manipulation member and the engagement claw 116 of the engagement member is disengaged from the engagement projection 120 of the coupling cylinder 111, as shown in FIG. 15. As a result, the coupling cylinder 111 and the support cylinder 112 are disconnected from each other, and the spool 106 and the coupling cylinder are freely rotatably supported by the support cylinder as the spool and the coupling cylinder remain in pressure contact with the drag members 114. When the rotor 105 is thereafter turned by the handle 101, the projection 127 of the return member 128 comes into contact with return portion 118 of the engagement member 119 to turn the engagement member clockwise as to FIG. 15 to disengage the operating portion 117 from the engaging notched part 126. At that time, the manipulation member 122 is moved forward by the outward urging force of the helical spring 123, and the engagement claw 116 is engaged with the engagement projection 120, as shown in FIG. 105, so that the coupling cylinder 111 and the support cylinder 112 are connected to each other. The spool 106 is thus semiautomatically returned into a state of receiving the action of the drag mechanism because the drag members 114 thereof are in pressure contact with the spool and the coupling cylinder.

Figure 13:
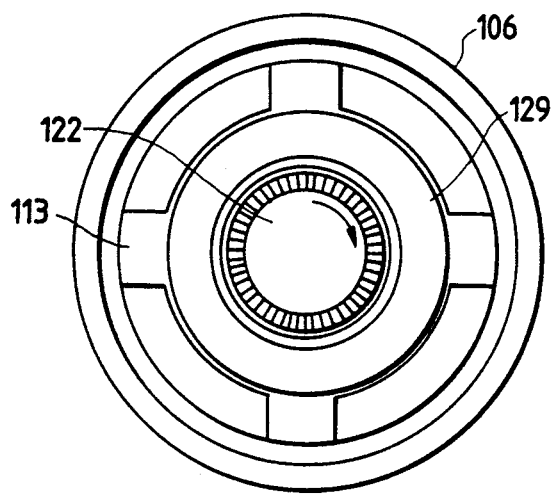
FIG. 13 is a front view of the spinning reel shown in FIG. 12.
Figure 14:
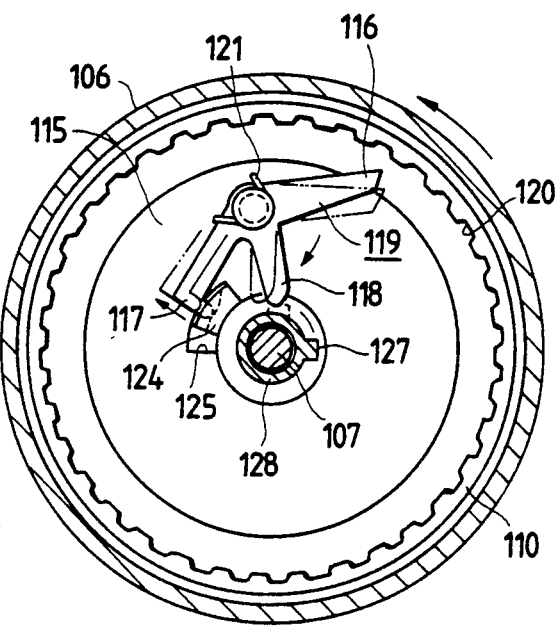
FIG. 14 is a sectional view of the spinning reel a-long a line D—D shown in FIG. 12.
Figure 17:
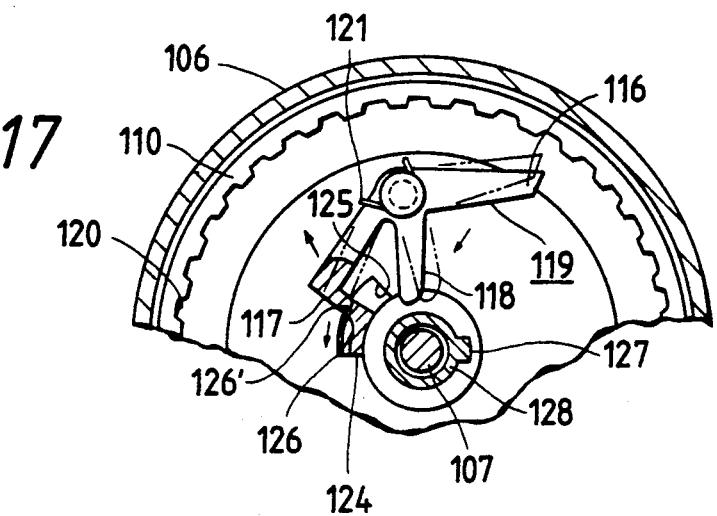

When the manipulation member 122 is moved in the notch 125 of the support cylinder 112 against the circumferential urging force of the helical spring 123 as shown by an arrow in FIG. 13, the operating portion 124 of the manipulation member is turned counterclockwise in the notch toward the other end thereof as shown in FIG. 17, so that the operating portion 117 of the engagement member 119 is stranded onto the stranding projection 126' of the engaging notched part 126 up from the non-projection surface thereof, the manipulation member is moved forward by the outward urging force of the helical spring 123, and the engagement claw 116 of the engagement member is engaged with the engagement projection 120 of the coupling cylinder 111. The spool 106 is thus manually returned into the state of receiving the action of the drag mechanism.

Figure 19:
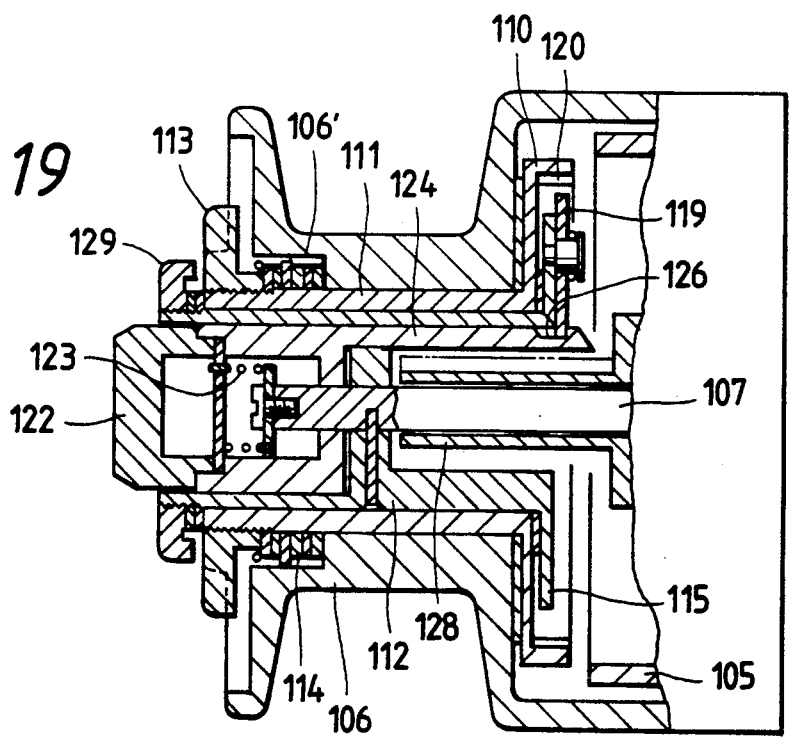
FIG. 19 is a cutaway side view of a major part of a spinning reel which is a further embodiment of the present invention.
Figure 18:
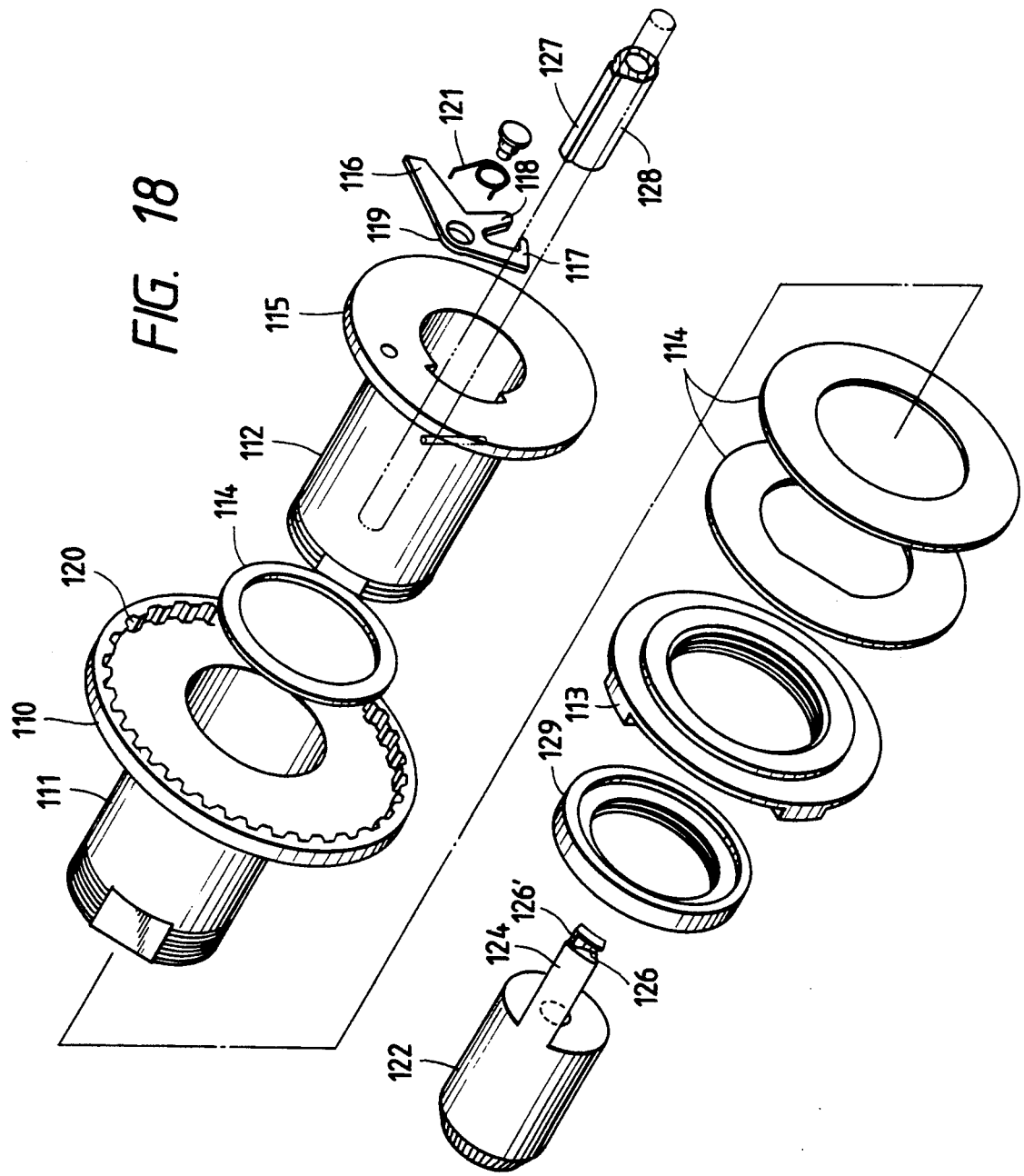
FIG. 18 is a perspective exploded view of a major part of the spinning reel shown in FIG. 12.

FIG. 19 shows a fourth embodiment of the invention. In this invention drag members 114 are not located on the front flange of a spool 106 but are instead located in a recess 106' provided in the spool.

Although the return member 128 is secured to the rotor 105 integrally therewith in each of the above-described embodiments, the present invention may be otherwise embodied so that the return member is frictionally connected to the rotor to make it possible to smoothly shift the spool into the state of receiving the action of the drag mechanism.

In a spinning reel provided in accordance with third and fourth embodiments of the present invention, a drag mechanism is provided for a spool so as to brake the rotation thereof. A shift mechanism for shifting the spool between a state of receiving the action of the drag mechanism and a state of rotating freely from the action is provided between the spool and a spool shaft so that the rotor turning mechanism, the spool sliding mechanism and so forth, which are provided in the casing of the reel, are not restricted. For that reason, the drive lines of the reel are not complicated, it is easy to assemble and disassemble the reel, the reel is less likely to develop trouble, the casing is prevented from being enlarged in size and weight, and the fishing manipulation of the reel is facilitated. Additionally, the spool can be semiautomatically shifted from the state of rotating freely from the action of the drag mechanism, into the state of receiving the action, by a return mechanism which acts in conjunction with the turning of a rotor.

Since the return mechanism is provided at the spool, the drive lines are not complicated in the casing and the casing is reduced in size and weight.

What is claimed is:

1. A spinning reel for fishing comprising:
a reel body;
a handle provided in said reel body;
a rotor rotatable in response to manual rotation of said handle;
a spool shaft slidably fitted in said rotor;
a spool provided on a front end of said spool shaft;
drag means located at a rear end of said spool shaft for braking rotation of the spool; and
means for shifting said spool from a drag state into a release state, said shifting means being provided between said spool and said spool shaft, said shifting means being comprised of a spool support cylinder for supporting said spool on an outer surface thereof and for allowing free rotation of said spool therearound, said spool support cylinder being secured to said spool shaft, an engagement member for engaging said spool support cylinder with said spool, and a manipulation member for manipulating said engaging member to engage with and disengage from said spool, said manipulation member being provided on an inner surface of said support cylinder.

2. The spinning reel according to claim 1, further including means for returning said spool from said release state to said drag state.

3. The spinning reel according to claim 2, wherein said returning means functions in conjunction with the rotation of said handle.

4. The spinning reel according to claim 1, wherein said engaging member includes an engagement claw, a manipulating portion and a return portion.

5. A spinning reel for fishing comprising:
a reel body;
a handle provided in said reel body;
a rotor rotatable in response to manual rotation of said handle;
a spool shaft slidably fitted in said rotor;
a spool provided on a front end of said spool shaft;
means for shifting said spool from a drag state into a release state, said shifting means being provided between said spool and said spool shaft, said shifting means including a support cylinder secured to said spool shaft, a coupling cylinder fitted on an outer surface of said support cylinder, and an engagement member for engaging said support cylinder with said coupling cylinder;
drag means located between said spool and said shifting means for braking the rotation of the spool; and
and a manipulation member for manipulating said engaging member to engage with and disengage from said coupling cylinder, said manipulation member being provided on an inner surface of said support cylinder.

6. The spinning reel according to claim 5, wherein said drag means includes drag members provided between said spool and said coupling cylinder.

7. The spinning reel according to claim 5, wherein said engaging member includes an engagement claw, a manipulating portion and a return portion.

8. The spinning reel according to claim 5, further including means for returning said spool from said release state to said drag state.

9. The spinning reel according to claim 8, wherein said returning means functions in conjunction with the rotation of said handle.

* * * * *